(No Model.)
P. DE VRIES.
Water Cooler and Filter.
No. 240,816.        Patented May 3, 1881.
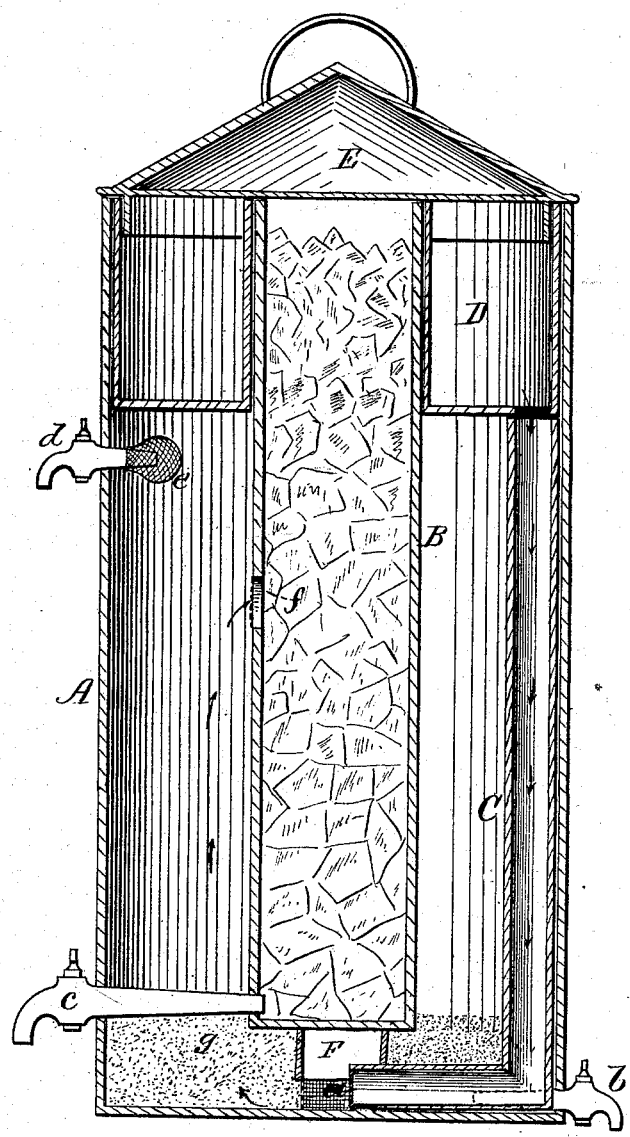
Witnesses.
H. C. Mc. Arthur
G. H. Moore
Inventor.
Peter De Vries,
per. Chas. H. Fowler.

UNITED STATES PATENT OFFICE.

PETER DE VRIES, OF TOLEDO, OHIO.

WATER COOLER AND FILTER.

SPECIFICATION forming part of Letters Patent No. 240,816, dated May 3, 1881.

Application filed March 15, 1881. (No model.)

*To all whom it may concern:*

Be it known that I, PETER DE VRIES, a citizen of the United States, residing at Toledo, in the county of Lucas and State of Ohio, have invented certain new and useful Improvements in Water Coolers and Filters; and I do hereby declare that the following is a full, clear, and exact description of the same, reference being had to the annexed drawing, making a part of this specification, and to the letters and figures of reference marked thereon.

The present invention has relation to certain new and useful improvements in combined water cooler and filter, and the object thereof is to provide means for cooling the water, and also purifying it by upward filtration, the construction of the several parts admitting the water being drawn off from the ice-receptacle, or from the outside thereof, as circumstances may require. These various results I attain by the construction shown in the accompanying drawing, and hereinafter described.

In the drawing, which represents a sectional elevation of my invention, A designates the outer casing or body, constructed of metal or other suitable material. The body A is provided with a central ice-receptacle, B, extending from the top thereof down to very near the bottom.

Between the bottom of the body A and lower end of the central ice-receptacle, B, is located a distributing-chamber, F, having wire-gauze around its lower edge. Into the chamber F enters the horizontal end of a pipe, C, the opening thereof being covered with wire-gauze a. The pipe C extends up and registers with an opening in a basin, D, said basin fitting within the top of the body A and around the upper end of the ice-receptacle B.

The body A, near its bottom, is provided with a suitable faucet, b, for airing the filter or cleansing the same, when found necessary.

The central ice-receptacle, B, near its lower end, has connected to it a faucet, c, which extends out through the body A, so that ice-water, when desired, can be drawn from said receptacle.

At or near the upper portion of the body A is connected thereto a faucet, d, so that filtered water can be drawn off independent of the water in the ice-receptacle, said faucet, if so desired, having connected to it a wire-gauze covering, e.

The central ice-receptacle, B, has an opening, f, through its side, covered with wire-gauze or perforated sheet metal, to prevent any foreign substance from entering the receptacle.

The body A, at its bottom, is loosely packed with a suitable filtering material, g, said body having a tightly-fitting cover, E, of any suitable construction.

The unfiltered water is discharged into the basin D, where it passes down through the pipe C into the distributing-chamber F. The chamber F may be of any suitable construction, so long as the object is attained—viz., that of preventing the water from passing too rapidly upward through the filtering material g, but spreading it evenly over the flat bottom of the cooler before percolating through the gravel, charcoal, and sand, or other suitable filtering material. The water, as it passes upward from the filtering material g, after having its impurities thoroughly removed, escapes through the opening f into the ice-receptacle B, so that when ice-water is required it may be drawn through the faucet c; but when cool water is not especially desired the filtered water remaining or standing in the body A, around the outside of the ice-receptacle B, may be had by turning on the faucet d.

Having now fully described my invention, what I claim as new, and desire to secure by Letters Patent, is—

In a combined water cooler and filter, the outer casing or body, A, provided with filtering material g at its bottom, central ice-receptacle, B, having opening f, and the faucets c d, in combination with the basin D, pipe C, and wire-gauze distributing-chamber F, substantially as and for the purpose set forth.

In testimony that I claim the above I have hereunto subscribed my name in the presence of two witnesses.

PETER DE VRIES.

Witnesses:
F. S. HOAG,
E. J. STICKLE.